Figure 1:
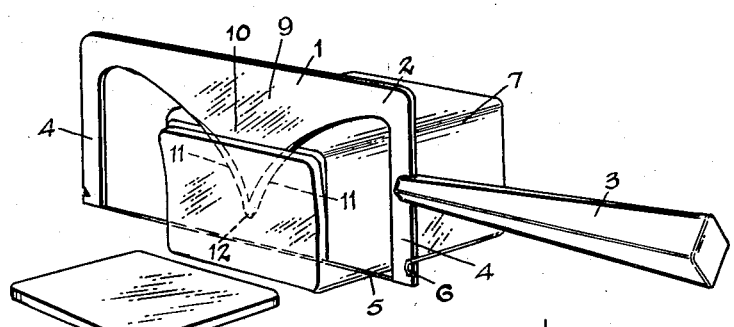

Aug. 18, 1936.   C. J. SCHNEIDER   2,051,426

SLICING UTENSIL

Filed Dec. 10, 1934

Inventor
Cale J. Schneider
By
Attorney

Patented Aug. 18, 1936

2,051,426

UNITED STATES PATENT OFFICE 2,051,426

SLICING UTENSIL

Cale J. Schneider, Toledo, Ohio

Application December 10, 1934, Serial No. 756,784

6 Claims. (Cl. 31—31)

My invention relates to a household hand utensil and particularly to a utensil for slicing and dividing materials, such as foods, into parts. The invention has for an object to provide a hand operated and guided food slicing utensil having a means for slicing material associated with a means for separating the sliced portions of the material from the body thereof. The means for separating cooperates directly with the slicing means and effects separation in immediate succession to slicing.

The invention has for another object to provide a means for separating the slices from the material body which functions with increasing effect over increased area of the slice as the area of the slice increases with slicing and in directions from substantially the center of the slice outwardly toward the edges thereof. A utensil embodying my invention is, therefore, particularly adapted to the slicing of materials of a flaccid moldability and whereof, even though sliced, the sliced portions tend to remain in self-sustained assembled relation to the body sliced. Such materials as soft cheese, butter, ice cream, and the like, are easily sliced into tissue-thick slices by the use of the utensil and served without crumbling or breaking of the slice and enabling artistic and tasty serving of the sliced material.

A further object of the invention is to provide a utensil of low cost and capable of rendering an efficient performance in slicing and separating foods.

The invention consists in other features and advantages which will appear from the following description and upon examination of the drawing. Structures containing the invention may partake of different forms and still embody the invention. To illustrate a practical application of the invention, I have selected a slicing utensil as an example of the various structures and details thereof that contain the invention and shall describe the selected slicing utensil hereinafter, it being understood that variations may be made without departing from the spirit of the invention. The particular slicing utensil selected is shown in the accompanying drawing and described hereinafter.

Figure 2:
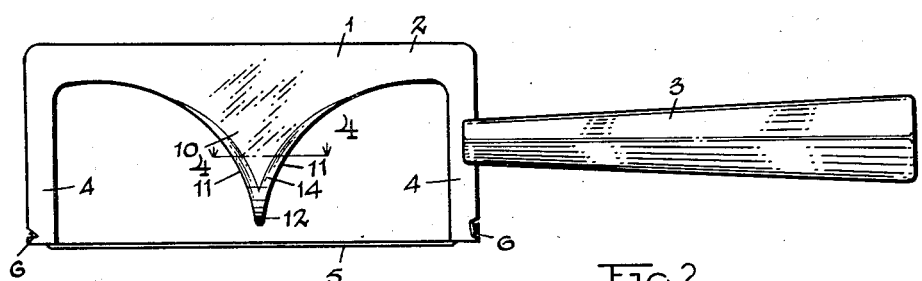
Figure 4:
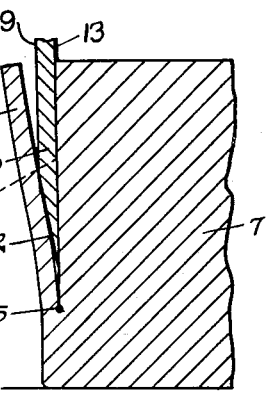
Figure 3:
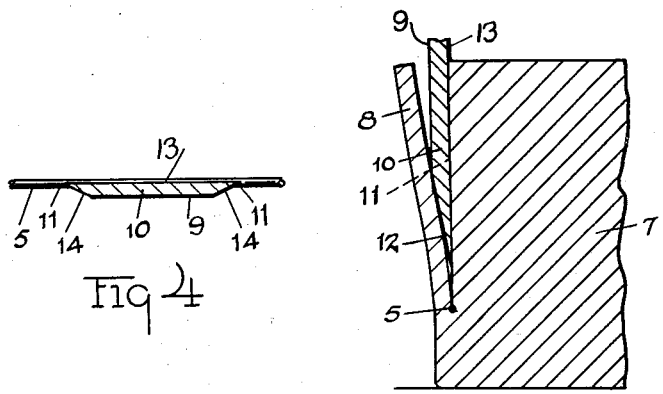

Fig. 1 of the accompanying drawing illustrates a perspective view of the slicing utensil chosen for purposes of illustration in one of its applications to work. Fig. 2 illustrates a face view of the utensil. Fig. 3 illustrates a view of a cross section of the material being sliced and the utensil and shows the relative operation of the cutting element and separating member. Fig. 4 illustrates a view of a section taken along the plane of the line 4—4 indicated in Fig. 2.

A utensil of my invention has a frame to which is connected a handle. The frame is preferably light-weight in character so as to enable ready manipulation of the utensil. The frame has a pair of depending legs between which extends a tautly drawn cutting element. The cutting element may be a fine metal band or wire and have a material severing surface part. A slice separating member or tongue is disposed on the frame intermediate the legs thereof and depends in parallel spaced relation to the legs. The tongue has a pair of spaced parallel surfaces, one of which is located in a plane extending through and along the cutting element. The tongue edges converge accurately from points on the frame proximate to the base of each leg to form a tongue tip. The tip is located in spaced relation to the cutting element and has a beveled edge extending from one plane surface of the tongue toward the other plane surface. Thus, as the frame is wielded by the handle to move the cutting element through the material, the tongue tip is directed into the line of cut, swath, or kerf, formed by the material severing surface part of the cutting element and between the slice portion and body portion of the material being sliced, the beveled edge facing the sliced portion to divert it away from the body portion while the unbeveled edge moves smoothly over the surface of the body portion. As the cutting element is moved further through the material to increase the sliced area, the tongue is moved between the slice and the body of the material sliced so that an increased area of the tongue engages the sliced portion, the contact between the sliced portion and the tongue increasing from the substantial center of the slice outwardly to the outer edges thereof.

In the particular construction shown in the drawing, the utensil 1 has a frame 2. A handle 3 is mounted on the frame 2 and is readily graspable for convenient and directive manipulation of the frame 2. The frame 2 has a pair of legs 4 which depend from the frame in parallel relation to each other.

A cutting element, such as a fine steel wire 5 is supported by the legs. The wire 5 extends between the legs and may be removably connected, as shown at 6, at its ends to an end of each leg. Preferably, the wire 5 is stretched tautly so as to resist movement when the frame 2 is manipulated to move a material severing surface part of the wire 5 through a material to be sliced, such as the brick of cheese 7, illustrated diagrammatically in Figs. 1 and 3 of the drawing. As the cutting element is so moved through the material, a slice, such as the slice 8, is formed.

In order to effect separation of the slice 8 from the body 7 in progression with the formation of the slice, a separating member, such as the tongue 10, is provided. The tongue 10 may be formed integral with the frame 2 and legs 4, being stamped from a single metal sheet. The tongue has parallel plane surfaces 9 and 13, the surface 13 being located in a plane extending through and along the material severing surface part of the cutting element 5 and the surface 9 being located in a plane spaced from the plane of the surface 13. The tongue 10 originates at points on the frame closely disposed to the base of each leg 4 and arcuately converges to form a relatively sharp tip 12. The edges 11 of the tongue are preferably chisel-shaped or beveled, as shown at 14, to facilitate the entry of the tongue between the slice 8 and material 7 and prevent crumbling or breaking of the slice. The beveled edge 14 tends to direct and deflect the slice 8 away from the material 7 as illustrated in Fig. 3 toward and along the surface 9, while the surface 13 is moved smoothly and evenly along the surface of the material 7 from which the slice 8 is made without deforming said surfaces.

Thus, it will be seen that progressively with the slicing of the material 7 by the cutting element or wire 5, the separating member or tongue will engage the slice 8 over an increased area in directions progressing from the substantial center of the slice toward the edges thereof.

The frame 2 may be moved angularly to move the wire 5 away from the material 7 immediately upon completion of the slicing to cause the slice 8 to fall and rest of its own weight on the tongue and thus form an effective slice delivering and serving means. By reason of the unbeveled complementary edge 11 of the edge 14 and of the location of the surface 13 with reference to the cutting wire 5, the slice surface of the material 7 will be smooth and even for the production of successive thin slices 8.

I claim:

1. A material slicing utensil having a frame, the frame having a pair of legs extending in parallel relation to each other, a cutting element connected at each of its ends to one of said pairs of legs, the cutting element having a material severing surface part, a handle connected to the frame for manually manipulating the utensil, and a slice separating member comprising an extension disposed on the frame between said legs and extending toward the cutting element, the extension having a pair of spaced parallel surfaces, one of said surfaces being located in a plane extending through and along the severing surface part of the cutting element so that, when the frame is manipulated by the handle to move the cutting element through a material to be sliced and the separating member is directed along and behind the line of movement of the cutting element, the said one surface moves in a plane parallel to and substantially within the confines of the kerf formed by the severing surface part of the cutting element.

2. A material slicing utensil having a frame, the frame having a pair of legs extending in parallel relation to each other, a cutting element connected at each of its ends to one of said pair of legs, a handle connected to the frame for manually manipulating the utensil, and a slice separating member comprising an extension projecting from the frame intermediate the legs to a point in spaced proximity to and midway of the length of the cutting element, the extension having a pair of spaced parallel surfaces, each surface being located in a plane parallel to a plane extending through and along the cutting element and being of gradually increased area within its said surface plane in portions progressively remote from the cutting element whereby, when the frame is manipulated by the handle to move the cutting element through a material to be sliced and the separating member is directed along and behind the line of movement of the cutting element, the separating member initially engages the substantially central portion of the slice being formed and subsequently and progressively with the continued slicing also engages portions on either side of said central portion.

3. A material slicing utensil having a frame, the frame having a pair of legs extending in parallel relation to each other, a cutting element connected at each of its ends to one of said pair of legs, a handle connected to the frame for manually manipulating the utensil, and a slice separating member comprising a tongue projecting from the frame intermediate the legs, the tongue having a pair of parallel surfaces, each of said surfaces extending from the frame with a gradually decreasing area to a point in spaced proximity to and substantially midway of the length of the cutting element, one of said surfaces being located in a plane extending through and along the cutting element so that, when the frame is manipulated by the handle to move the cutting element through a material to be sliced and the separating member is directed along and behind the line of movement of the cutting element, the tongue initially engages the central portion of the slice and subsequently engages portions on either side of said central portion while the said one surface moves in a plane parallel to and within the confines of the swath of the cutting element.

4. A material slicing utensil having a frame, the frame having a pair of legs extending in parallel relation to each other, a cutting element connected to the said legs, a handle connected to the frame for manually manipulating the utensil, and a slice separating member comprising an extension disposed on the frame between said legs and extending toward the cutting element, the extension having a pair of spaced parallel surfaces, one of said surfaces being located in a plane extending through and along the material dividing line of the cutting element so that, when the frame is manipulated by the handle to move the cutting element through a material to be sliced and the separating member is directed along and behind the line of movement of the cutting element, the said one surface moves in a plane parallel to and substantially within the confines of the kerf formed by the cutting element.

5. A material slicing utensil having a frame, the frame having a pair of legs extending in parallel relation to each other, a cutting element connected to the said legs, a handle connected to the frame for manually manipulating the utensil, and a slice separating member comprising an extension disposed on the frame between said legs and extending toward the cutting element, the extension having a pair of spaced parallel surfaces, one of said surfaces being located in a plane extending parallel to and within the confines of a kerf formed in a material to be sliced when the frame is manipulated by the handle to move the cutting element through the material whereby the face of the material from which the slice is formed is maintained smooth and undistorted.

6. A material slicing utensil having a frame, the frame having a pair of legs extending in parallel relation to each other, a cutting element connected at each of its ends to one of said pair of legs and maintained under tension thereby, a handle connected to the frame for manually manipulating the utensil, and a slice separating member comprising an extension disposed on the frame between said legs and extending toward the cutting element, the extension having a pair of spaced parallel surfaces, one of said surfaces being located in a plane extending through and along the cutting element so that, when the frame is manipulated by the handle to move the cutting element through a material to be sliced and the separating member is directed along and behind the line of movement of the cutting element, the said one surface moves in a plane parallel to and substantially within the confines of the kerf formed by the cutting element.

CALE J. SCHNEIDER.